United States Patent [19]
Ellsworth

[11] Patent Number: 5,358,074
[45] Date of Patent: Oct. 25, 1994

[54] MOTOR DRIVE MOUNTING FOR ELEVATOR LEG

[76] Inventor: Clayton S. Ellsworth, 1014 Sherwood Rd., Norfolk, Nebr. 68701

[21] Appl. No.: 161,429

[22] Filed: Dec. 6, 1993

[51] Int. Cl.$^5$ .............................................. B66B 11/04
[52] U.S. Cl. ................................... 474/113; 384/626; 187/250
[58] Field of Search ................ 187/20, 22; 474/113, 474/114; 384/626, 428, 252, 247; 198/701, 709, 806, 807

[56] References Cited

U.S. PATENT DOCUMENTS

| | | | |
|---|---|---|---|
| 2,722,132 | 11/1955 | Russell | 474/113 |
| 2,960,883 | 11/1960 | Sznycer | 474/113 |
| 3,753,542 | 8/1973 | Sloyan | 474/114 |
| 3,872,801 | 3/1975 | Weddendorf | 474/114 |
| 4,648,854 | 3/1987 | Redington | 474/114 |
| 4,765,759 | 8/1988 | Le Breton | 384/252 |

FOREIGN PATENT DOCUMENTS 1604014 12/1981 United Kingdom ............... 384/626

*Primary Examiner*—Kenneth W. Noland

[57] ABSTRACT

An adjusting device for aligning a drive pulley for an elevator leg or similar belt conveyor. The driving mechanism, normally perpendicular to the axis of the pulley, is pivotally mounted so that the drive shaft may be slightly tilted. The bearing block opposite the driven part of the shaft is mounted on shims to allow the movement of the axis of the shaft.

5 Claims, 1 Drawing Sheet

MOTOR DRIVE MOUNTING FOR ELEVATOR LEG

BACKGROUND AND SUMMARY OF THE INVENTION

This invention pertains to driving devices for belt conveyors such as grain elevator legs where the drive and power devices are often at the top of an elevator where it is difficult to reach in order to make adjustments. The device includes a tilting main drive axle having one side tiltable and the opposite side adjustable by the use of shims.

Because this device is principally usable on grain elevator conveyor legs, it will be described in that setting. However, it may be useful in other settings where belt type conveyors are used.

In grain elevators, the elevating device is typically a conveyor belt having a series of cups fastened to the belt. The belt is driven from a top or drive pulley and is held taut by the bottom pulley. Grain is caught in the cups as they are lifted on one side of the pulley and is elevated by the rising cups which dump their contents as they go over the upper pulley.

Because the upper pulley is necessarily at the top of the elevator above the top level of grain when the bin of the elevator is completely full, it is relatively difficult to get at. Therefore, if the pulley is even slightly misaligned so that adjustment is needed, there is some difficulty reaching the location of the pulley. That difficulty is compounded when the adjustment requires belts to be loosened, retightened and then readjusted again after testing the alignment by running the belt.

By the present invention, an adjustment of the alignment of the upper pulley in particular is made much easier so that the realignment of the pulley becomes substantially less onerous and probably more accurate because of the relative ease of the task.

DESCRIPTION

Figure 3:
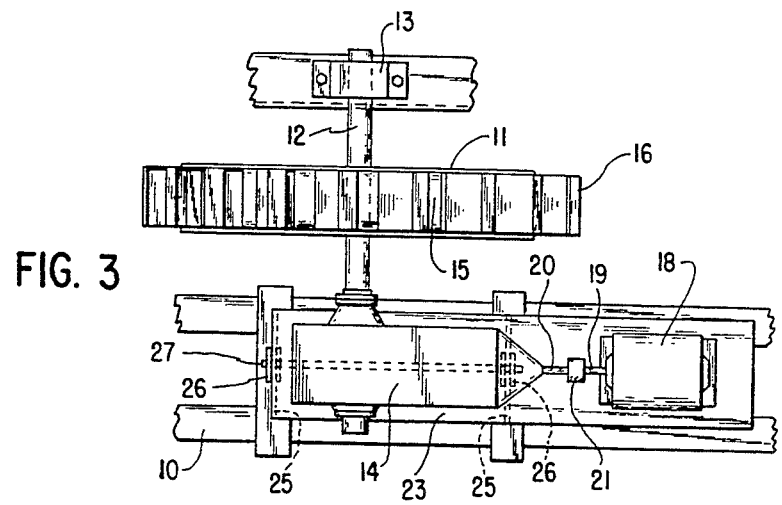
FIG. 3 is a top plan view of the machinery in FIG. 1.

Briefly, the present invention comprises an upper belt drive mechanism for a leg of a grain elevator in which the mounting of the power mechanism and the support for the upper pulley is mounted for easy realignment of the pulley.

More specifically and referring to the drawings, the mechanism for the upper pulley is mounted on a frame 10 which supports the entire leg elevator including lower and upper pulleys and the belt between them. The upper pulley 11 is mounted on a shaft 12 journalled at one end in a bearing block 13 and supported at the opposite end by a gear box 14. The belt 15 driven by the pulley 11 is held between the upper pulley 11 and a lower pulley—not shown—in a manner well known in the art. Cups 16 are mounted on the belt 15 to carry the grain and to dump it into a hopper as the cups 16 are inverted in passing over the upper pulley 11.

A motor 18 drives the shaft 12 through the gear box 14. The motor shaft 19 is connected to the gear box input shaft 20 through a universal joint 21 or similar connector so that slight misalignment can be accommodated. However, any tilting or misalignment of the pulley shaft 12 results in a tilting of the pulley 11 with consequent running off of the belt 15. The motor 18 and gear box 14 are fixed to a base 23 to hold the two driving parts in position.

Figure 2:
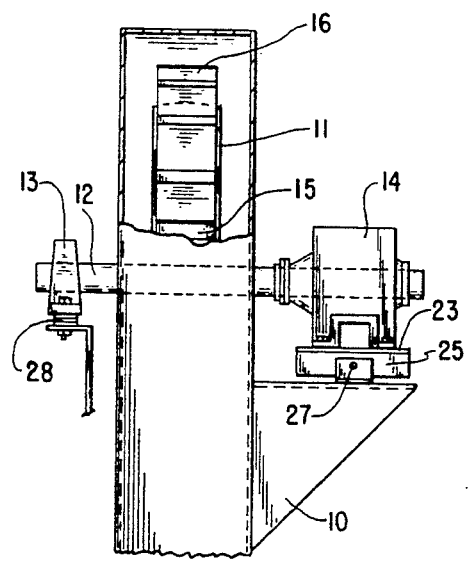
FIG. 2 is an edge elevational view of the machinery shown in FIG. 1, with a protective cover in place but partly broken away to show underlying parts.
Figure 1:
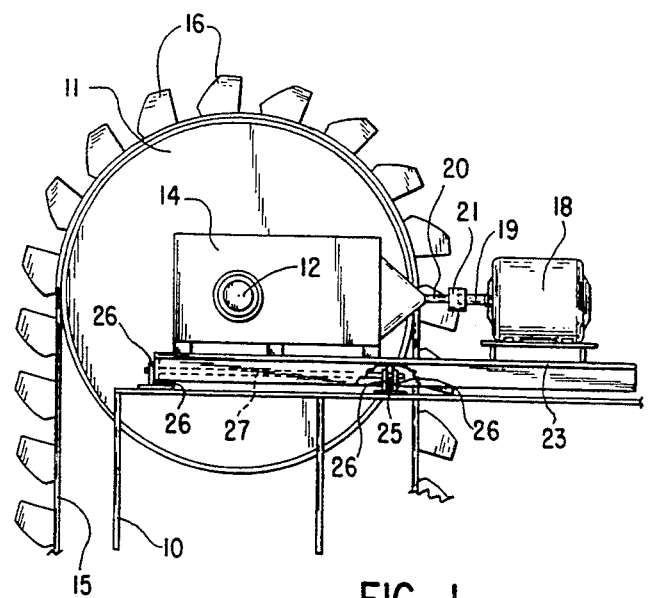
FIG. 1 is a side elevational view of the upper pulley with the belt in place and the drive means and its mounting, without a cover.

In order to avoid sideways movement of the belt on the pulley, the base 23 is mounted tiltingly with respect to the frame wall. The shaft 12 and therefore the pulley 11 can then be adjusted very easily to provide proper alignment. The base 23 includes flanges 25 extending downwardly between ears 26 affixed to the frame 10. An axle 27 extending through both the flange 25 and the ears 26 provide for the tilting of the base 23. The tilting of the shaft 12 is provided by raising or lowering of the bearing block 13. The means to do the raising and lowering includes the use of shims 25 (FIG. 2) under the bearing block. The addition or subtraction of shims under an otherwise fixed bearing block 13 also means that the relative tilt of the shaft 12 can be controlled solely by the total thickness of the pile of shims. Thus, the base 23 can be freely tiltable except for the restraint provided by the fixed bearing block 13.

I claim as my invention:

1. Adjustment means for aligning at least a first pulley of a transporting device, said transporting device including a flat belt entrained over at least two pulleys at opposite sides of the transporting device, said first pulley having a shaft for rotatable mounting said first pulley, said adjustment means comprising tiltable means for the support of a first end of said shaft, bearing means for the support of the second end of said shaft, only said bearing means being adjustable to a plurality of fixed positions whereby said shaft is tiltingly mounted and controlled.

2. The adjustment means of claim 1 in which said said pulley is a driven pulley, said tiltable means comprising a base, drive means mounted on said base and adapted to drive said one pulley through said shaft.

3. The adjustment means of claim 2 in which said second end of said shaft is journalled in a bearing block, said bearing block being mounted on a frame, shims engaged between said block and said frame whereby the tilt of said shaft can be controlled.

4. The adjustment means of claim 2 in which said drive means includes a motor mounted on said base, gear means driven by said motor also mounted on said base whereby both said motor and said gear means can be tilted as a unit to tilt said shaft.

5. The adjustment means of claim 4 in which said base includes depending flanges, ears fixed on said frame on both side of said flanges, an axle extending through said ears and flanges to provide a tilting axis about which said base may be tilted.

* * * * *